United States Patent
Hui et al.

(10) Patent No.: US 12,490,169 B2
(45) Date of Patent: Dec. 2, 2025

(54) METHOD AND DEVICE FOR THREAD OVER INTERNET PROTOCOL

(71) Applicant: Google LLC, Mountain View, CA (US)

(72) Inventors: Jonathan Wing-Yan Hui, Belmont, CA (US); Abtin Keshavarzian, Mountain View, CA (US); Matt Daniel Smith, San Jose, CA (US); Yakun Xu, Shanghai (CN)

(73) Assignee: Google LLC, Mountain View, CA (US)

( * ) Notice: Subject to any disclaimer, the term of this patent is extended or adjusted under 35 U.S.C. 154(b) by 382 days.

(21) Appl. No.: 17/996,071

(22) PCT Filed: May 14, 2021

(86) PCT No.: PCT/US2021/032422
§ 371 (c)(1),
(2) Date: Oct. 12, 2022

(87) PCT Pub. No.: WO2021/231844
PCT Pub. Date: Nov. 18, 2021

(65) Prior Publication Data
US 2023/0199610 A1    Jun. 22, 2023

Related U.S. Application Data

(60) Provisional application No. 63/025,791, filed on May 15, 2020.

(51) Int. Cl.
*H04W 40/12* (2009.01)
*H04W 80/02* (2009.01)
*H04W 84/10* (2009.01)

(52) U.S. Cl.
CPC ............ *H04W 40/12* (2013.01); *H04W 80/02* (2013.01); *H04W 84/10* (2013.01)

(58) Field of Classification Search
CPC ..... H04W 40/12; H04W 80/02; H04W 84/10; H04W 80/00; H04W 84/18; H04L 12/2807; H04L 69/16; H04L 69/30; Y02D 30/70
See application file for complete search history.

(56) References Cited

U.S. PATENT DOCUMENTS

2010/0061272 A1   3/2010   Veillette
2010/0278062 A1   11/2010  Abraham et al.
(Continued)

FOREIGN PATENT DOCUMENTS

CN    108574725 A    9/2018
JP    6277330        2/2018
(Continued)

OTHER PUBLICATIONS

"International Search Report and Written Opinion", Application No. PCT/US2021/032422, Aug. 25, 2021, 12 pages.
(Continued)

*Primary Examiner* — Joseph E Avellino
*Assistant Examiner* — Adam Joel Cerlanek
(74) *Attorney, Agent, or Firm* — Colby Nipper PLLC

(57) ABSTRACT

Techniques and devices for determining a preferred physical layer for communication by a node in a Thread network are described. The node transmits a first IPv6 over Low power Wireless Personal Area Networks, 6LoWPAN, frame to a neighbor node using a first physical layer and transmits the first 6LoWPAN frame to the neighbor node using a second physical layer. The node determines a first preference value for the neighbor node using the first physical layer and determines a second preference value for the neighbor node using the second physical layer. The node compares the first preference value and the second preference value to determine the preferred physical layer for communication and
(Continued)

transmits a second 6LoWPAN frame to the neighbor node using the preferred physical layer.

20 Claims, 8 Drawing Sheets

(56) References Cited

U.S. PATENT DOCUMENTS

| | | | |
|---|---|---|---|
| 2012/0327955 A1 | 12/2012 | Herrmann et al. | |
| 2015/0106519 A1* | 4/2015 | Lu | H04W 4/20 709/225 |
| 2016/0191380 A1* | 6/2016 | De | H04W 40/02 370/338 |
| 2016/0374133 A1* | 12/2016 | Logue | H04W 76/14 |
| 2018/0131639 A1* | 5/2018 | Siemens | H04L 1/1874 |
| 2019/0074994 A1* | 3/2019 | Becker | H04L 12/4625 |
| 2020/0112839 A1* | 4/2020 | Holcombe | G01D 4/002 |
| 2022/0150030 A1* | 5/2022 | Li | H04W 72/20 |
| 2023/0110131 A1* | 4/2023 | Smith | H04L 61/5069 370/254 |

FOREIGN PATENT DOCUMENTS

| | | |
|---|---|---|
| KR | 101829096 B1 | 2/2018 |
| WO | 2021231844 | 11/2021 |

OTHER PUBLICATIONS

"Foreign Office Action", AU Application No. 2021271726, Apr. 27, 2023, 3 pages.

"Foreign Office Action", CA Application No. 3178887, Mar. 26, 2024, 4 pages.

"Foreign Office Action", KR Application No. 10-2022-7037228, May 1, 2024, 11 pages.

"Foreign Office Action", JP Application No. 2022-566265, Nov. 7, 2023, 4 pages.

"International Preliminary Report on Patentability", Application No. PCT/US2021/032422, Nov. 15, 2022, 9 pages.

"Foreign Office Action", CN Application No. 202180030767.7, Nov. 27, 2024, 21 pages.

"Foreign Office Action", EP Application No. 21730407.0, Apr. 24, 2025, 7 pages.

\* cited by examiner

| Version 402 | Rsv 404 | A 406 | Typ 408 | Channel 410 | 802.15.4 Destination PAN ID 412 |
|---|---|---|---|---|---|

| Packet Number 414 |
|---|

| 802.15.4 Extended Source Address 416 |
|---|

| 802.15.4 Extended Destination Address 418 |
|---|

| 802.15.4 MAC Frame 420 |
|---|

METHOD AND DEVICE FOR THREAD OVER INTERNET PROTOCOL

RELATED APPLICATION(S)

This application is a national stage entry of International Application No. PCT/US2021/032422, filed May 14, 2021, which claims the benefit of U.S. Provisional Application No. 63/025,791, filed May 15, 2020, the disclosures of which are incorporated herein by reference in their entirety.

BACKGROUND

Using wireless networking to connect devices to each other, and to cloud-based services, is increasingly popular for sensing environmental conditions, controlling equipment, and providing information and alerts to users. Many devices on wireless networks are designed to operate for extended periods of time on battery-power, which limits the available computing, user interface, and radio resources in these devices.

The Thread 1.1 networking is specified to operate over IEEE 802.15.4 radio networks. Designed to operate with no single point of failure, Thread networks automatically organize into separate Thread partitions when there is no connectivity between two or more sets of devices. Thread partitions allow devices to maintain communication with other devices in the same Thread partition. Because Thread is still a nascent technology, coverage of a Thread network may be limited in many situations. As a result, Thread partitions are likely to occur while Thread deployment is sparse and thus, there are opportunities to enhance device connectivity in Thread networks.

SUMMARY

This summary is provided to introduce concepts of Thread over Internet Protocol, generally related to providing connectivity using multiple networking technologies in a fabric network for IPv6 communication. The concepts are further described below in the Detailed Description. This summary is not intended to identify essential features of the claimed subject matter, nor is it intended for use in determining the scope of the claimed subject matter.

In aspects, methods, devices, systems, and means for Thread over Internet Protocol are described for determining a preferred physical layer for communication by a node in a network, particularly a Thread network. The node transmits a first IPv6 over Low power Wireless Personal Area Networks, 6LoWPAN, frame to a neighbor node using a first physical layer and transmits the first 6LoWPAN frame to the neighbor node using a second physical layer. The node determines a first preference value for the neighbor node using the first physical layer and determines a second preference value for the neighbor node using the second physical layer. The node compares the first preference value and the second preference value to determine the preferred physical layer for communication and transmits a second 6LoWPAN frame to the neighbor node using the preferred physical layer.

The details of one or more implementations are set forth in the accompanying drawings and the following description. Other features and advantages will be apparent from the description and drawings and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

Aspects of Thread over Internet Protocol are described with reference to the following drawings. The same numbers are used throughout the drawings to reference like features and components.

DETAILED DESCRIPTION

Figure 1:
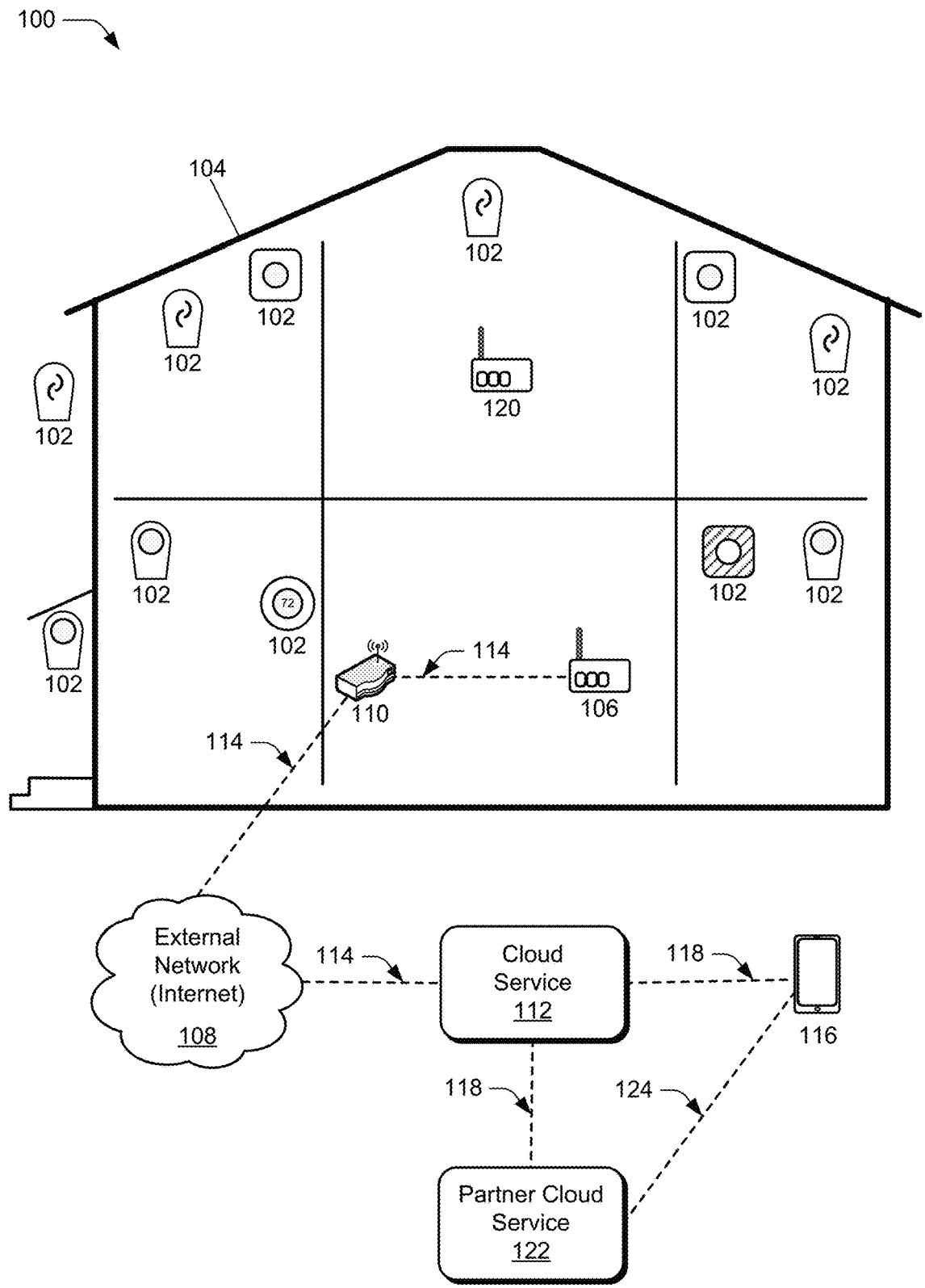
FIG. 1 illustrates an example network environment in which various aspects of Thread over Internet Protocol can be implemented.

This document specifies how Thread devices can incorporate Internet Protocol (IP)-based link technologies (e.g., Wi-Fi and/or Ethernet) into the Thread network topology. Doing so allows a Thread network to leverage the benefits of Wi-Fi and Ethernet, including higher throughput, greater channel capacity, and/or coverage, while still supporting low-power devices that must operate for years on modest batteries. At the same time, devices implementing Thread over Internet Protocol remain fully backward compatible with earlier versions of the Thread specification.

Wi-Fi is in many ways complementary to Thread. The ubiquity of Wi-Fi has driven many consumers to ensure whole-home Wi-Fi coverage. The advent of Wi-Fi Mesh solutions has also helped to improve Wi-Fi coverage. At the same time, Wi-Fi offers higher throughput, greater channel capacity, and additional communication frequencies, at the cost of higher power consumption.

From its inception, Thread was designed to provide network connectivity with no single point of failure in the network. As a self-healing, mesh network, this robustness principle maintains device-to-device communication as long as there is a communication path between a set of communicating devices. This is in contrast to Wi-Fi networks that often rely on the availability of a single wireless access point to provide connectivity.

While a Thread network is defined by a set of devices that share the same Thread network credentials, a Thread partition is a set of Thread devices in a given Thread network that are connected to each other. In other words, within a Thread partition, there is a communication path between every pair of devices in the partition. Thread autonomously forms partitions based on observed connectivity between devices. Because connectivity is time varying (especially for wireless communication), a given partition may split into multiple partitions when connectivity is lost. Conversely, multiple partitions may merge into a single partition if connectivity is restored between the multiple partitions.

Each Thread partition has a dynamically elected leader device. The leader device periodically increments a sequence number and propagates the updated values via Mesh Link Establishment (MLE) Advertisements. Thread devices determine whether they are connected to the partition by observing the leader's sequence number value when receiving MLE Advertisements. If a Thread device has not seen the leader's sequence number change for some time, the Thread device determines that it has become disconnected from the leader device.

After losing connectivity, the device attempts to attach to another partition. If no such partition exists, it forms its own partition and declares itself the leader. Neighboring devices that have also lost connectivity perform the same process. If a large set of devices have become partitioned simultaneously, many of those devices may form their own partitions even though they may still have connectivity. Eventually, the set of connected devices will merge into a single partition using Thread's partition merging mechanism.

Because Thread devices must be in the same Thread partition to communicate over the Thread mesh network, Thread networking protocols continuously seek to merge partitions whenever possible. Each partition is identified by a partition identifier (ID) that the leader device randomly selects when forming the partition. Thread devices include the partition ID in MLE Advertisements. If a device receives an MLE Advertisement with a higher partition ID than its own, the device will attempt to attach to the new partition and leave its current partition.

A Thread network that has been partitioned can raise significant challenges. For example, devices in different Thread partitions cannot communicate using the Thread mesh network but may be able to communicate via a Thread border router, utilizing other IP-based networks. However, supporting this approach adds significant complexity in dynamically managing multiple IPv6 subnets and routing between them. In another example, partitioning and merging Thread network partitions is costly as affected devices must reattach to the network as end devices, router-capable devices need to obtain new router IDs, the routing topology needs to be formed and/or updated, border routers need to inject new network data, and so forth. This adds significant control messaging overhead. During this period, application data messages may be significantly delayed or lost. In a further example, managing multiple partitions may be confusing to an end user. When commissioning a new device onto a Thread network, the user must somehow determine a Thread Border Router attached to a Thread partition that can provide connectivity to the joining device. When updating Thread network parameters, the user must manually configure each and every partition individually.

Wi-Fi and Thread networking technologies complement each other as IP-based link technologies. While Thread is well-suited for low-power devices, Wi-Fi offers higher throughput and capacity. At the same time, with the advent of Wi-Fi mesh solutions, Wi-Fi coverage in consumer homes has also improved dramatically. While Thread is a nascent technology, Wi-Fi is likely to have broader coverage within consumers' homes until Thread becomes more widely deployed. Combining Wi-Fi and IEEE 802.15.4 links in a singular Thread topology can combine their benefits and address the issues presented by partitioned Thread networks.

While a Thread network may consist of multiple Thread partitions, a Thread Domain may be composed of multiple Thread networks. A Thread domain combines multiple Thread networks into a single IPv6 subnet, allowing devices to maintain stable IPv6 addresses even as they roam between different Thread networks in the same domain. While a Thread domain utilizes Wi-Fi and/or Ethernet as a backbone link to stitch multiple Thread networks into a single IPv6 subnet, previous versions of Thread (e.g., Thread 1.2) do not provide any mechanism for a given Thread partition to utilize Wi-Fi or Ethernet in its routing topology.

Example Environment

FIG. 1 illustrates an example network environment 100 in which aspects of Thread over Internet Protocol can be implemented. The network environment 100 (e.g., a fabric network, a Thread network, a Connected Home over IP (CHIP) network, a Weave network) includes one or more network segments that form a home area network (HAN) such as a HAN 200, described below with respect to FIG. 2. The HAN includes wireless network devices 102 that are disposed about a structure 104, such as a house, and are connected by one or more wireless and/or wired network technologies, as described below. The HAN includes a border router 106 that connects the HAN to an external network 108 (access network 108), such as the Internet, through a home router or access point 110.

To provide user access to functions implemented using the wireless network devices 102 in the HAN, a cloud service 112 connects to the HAN via border router 106, via a secure tunnel 114 through the external network 108 (access network 108) and the access point 110. The cloud service 112 facilitates communication between the HAN and internet clients 116, such as apps on mobile devices, using a web-based application programming interface (API) 118. The cloud service 112 also manages a home graph that describes connections and relationships between the wireless network devices 102, elements of the structure 104, and users. The cloud service 112 hosts controllers which orchestrate and arbitrate home automation experiences, as described in greater detail below.

The HAN may include one or more wireless network devices 102 that function as a hub 120. The hub 120 may be a general-purpose home automation hub, or an application-specific hub, such as a security hub, an energy management hub, an HVAC hub, and so forth. The functionality of a hub 120 may also be integrated into any wireless network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat. Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 2:
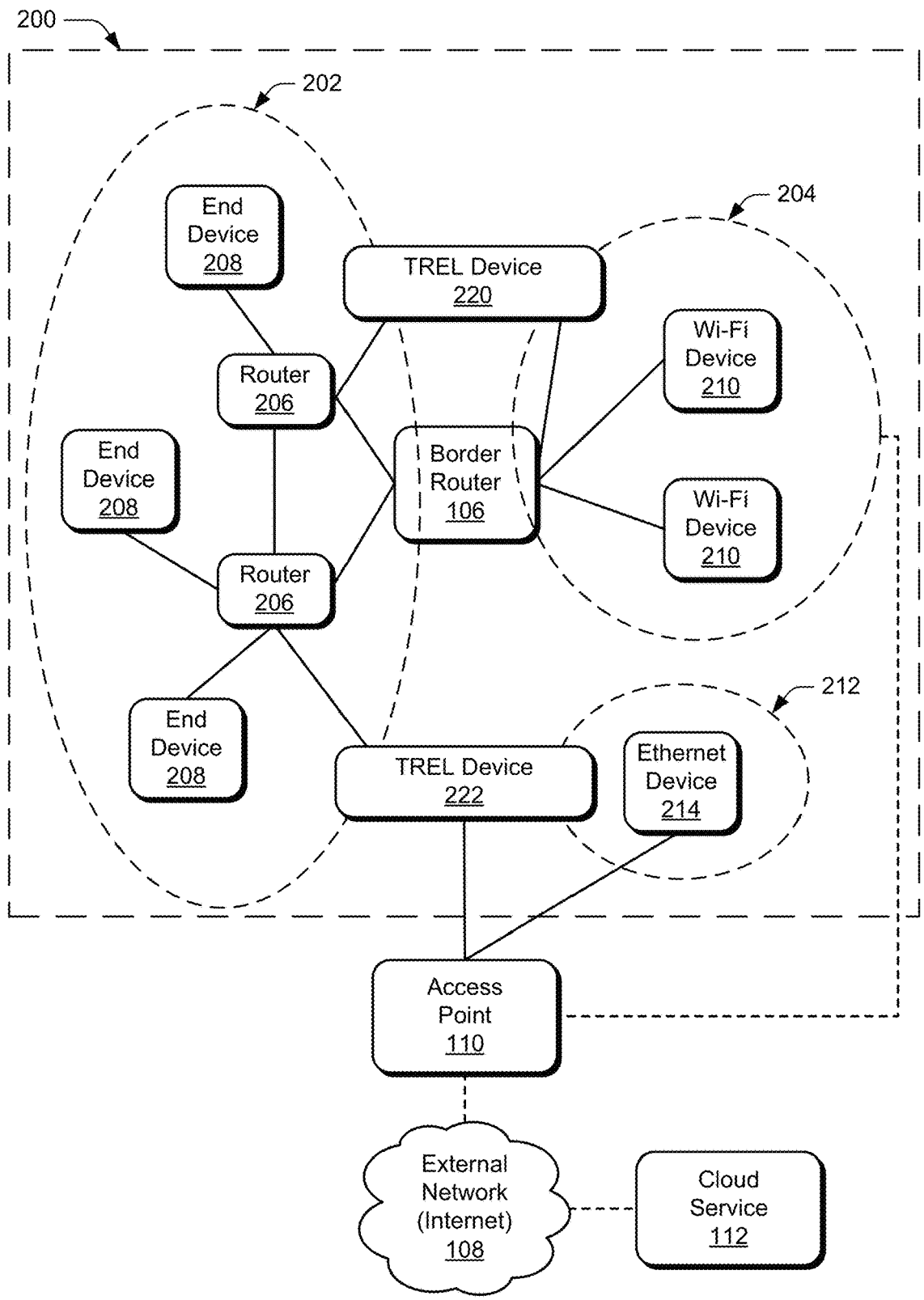
FIG. 2 illustrates an example environment in which various aspects of Thread over Internet Protocol can be implemented.

FIG. 2 illustrates an example environment (e.g., a fabric network, a Weave network, a CHIP network) in which various aspects of Thread over Internet Protocol can be implemented. The home area network (HAN, Thread network) 200 may include a wireless mesh network segment 202 (e.g., a Thread network segment), a Wi-Fi network segment 204, and/or an Ethernet segment 212. The mesh network segment 202 is a Wireless Personal Area Network (WPAN) implementing the Thread Specification, in particular the Thread Specification 1.0, 1.1, 1.2, or any later version. For example, the mesh network segment 202 may be compatible with version 1.1 and/or version 1.2 of the Thread Specification. The Wi-Fi segment 204 is a Wireless Local Area Network (WLAN) implementing the IEEE 802.11 standard, in particular the IEEE 802.11 standard of 1997 and/or any later version such as 802.11b, 802.11g, 802.11n, 802.11ac, 802.11ax, and 802.11ad. For example, the Wi-Fi segment 204 may be compatible with one or more, e.g. all, of these versions. The wireless mesh network segment 202 includes routers 206 and end devices 208. The routers 206 and the end devices 208, each include a mesh network interface for communication over the mesh network segment 202. The routers 206 receive and transmit packet data over the mesh network interface. The routers 206 also route traffic across the mesh network segment 202. The end devices 208 are devices that can communicate using the mesh network segment 202, but lack the capability, beyond simply forwarding to its parent router 206, to route traffic in the mesh network segment 202. One or more of the end devices 208 may be battery powered. For example, a battery-powered sensor is one type of end device 208. The Wi-Fi network segment 204 includes Wi-Fi devices 210. Each Wi-Fi device 210 includes a Wi-Fi network interface for communication over the Wi-Fi network segment 204. Optionally or additionally, the HAN 200 can include an Ethernet network segment 212 that includes one or more Ethernet devices 214 that connect to the border router 106 or the access point 110. The Ethernet network segment 212 may be compatible with the IEEE 802.3 standard of any version, e.g., 802.3cu or any prior version.

The border router 106 is included in the wireless mesh network segment 202 and is included in the Wi-Fi network segment 204. The border router 106 includes a mesh network interface for communication over the mesh network segment 202 and a Wi-Fi network interface for communication over the Wi-Fi network segment 204. The border router 106 routes packets between devices in the wireless mesh network segment 202 and the Wi-Fi network segment 204. The border router 106 also routes packets between devices in the HAN 200 and external network nodes (e.g., the cloud service 112) via the access network 108, such as the Internet, through a home router or access point 110.

The devices in the mesh network segment 202, the Wi-Fi network segment 204, and the Ethernet network segment 212 use standard IP routing configurations to communicate with each other through transport protocols such as the User Datagram Protocol (UDP) or the Transmission Control Protocol (TCP). When the devices in the mesh network segment 202, the Wi-Fi network segment 204 and/or the Ethernet network segment 212 are provisioned as part of a Weave network, a fabric network, or a CHIP network, the devices can communicate messages over those same UDP and/or TCP transports.

Thread Radio Encapsulation Link (TREL) devices (nodes) support multiple physical layer communications such as IEEE 802.15.4, Wi-Fi and/or Ethernet. For example, TREL device 220 supports IEEE 802.15.4 for communication over the wireless mesh network segment 202 and the Wi-Fi network segment 204. In another example, TREL device 222 supports IEEE 802.15.4 for communication over the wireless mesh network segment 202 and the Ethernet network segment 212. The TREL nodes communicate using the TREL networking stack, described below with respect to FIG. 3.

Thread Radio Encapsulation Link (TREL) Networking Stack

Figure 3:
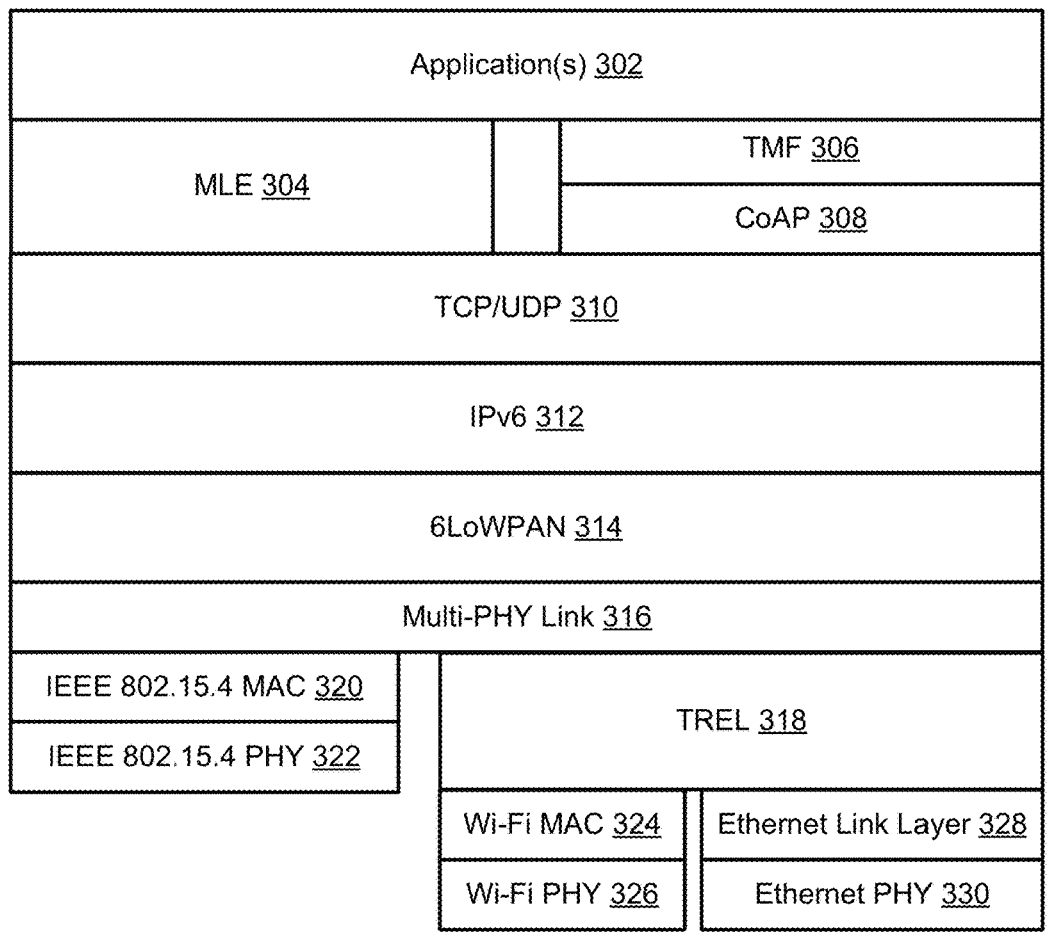
FIG. 3 illustrates an example networking protocol stack with which aspects of Thread over Internet Protocol can be implemented.

FIG. 3 illustrates an example of a Thread Radio Encapsulation Link (TREL) network protocol stack 300 with which aspects of Thread over Internet Protocol can be implemented. In an aspect, Thread devices can utilize multiple IP-based link technologies using the multiple physical layer (multi-phy, multi-PHY) link layer of the TREL networking stack 300. The TREL networking stack 300 provides backward compatibility for IEEE 802.15.4 wireless networking used in previous versions of Thread (e.g., Thread 1.1 and 1.2).

The TREL networking stack 300 includes support for application(s) 302 with a Mesh Link Establishment (MLE) protocol layer 304, a Thread Management Framework (TMF) protocol layer 306, and a Constrained Application Protocol (CoAP) protocol layer 308. In the TREL networking stack 300, Thread messages are transported by a Transmission Control Protocol (TCP) layer 310 or a User Datagram Protocol (UDP) layer 310, an Internet Protocol version 6 (IPv6) layer 312, and an IPv6 over Low power Wireless Personal Area Networks (6LoWPAN) protocol layer 314.

To minimize changes to the existing versions of the Thread networking protocols, a multi-phy link layer 316 presents a single link interface to upper layers of the TREL networking stack 300 for one or more physical layers (PHYs). From a network layering perspective, the multi-phy link layer 316 sits below the 6LoWPAN protocol layer 314. 6LoWPAN frames are addressed using short or extended addresses as defined in the Thread Specification, version 1.1. The multi-phy link layer 316 has one short address and one extended address. The multi-phy link layer 316 is responsible for determining which PHY to use when transmitting to neighboring devices. In some cases, a neighbor may be reachable over multiple PHYs simultaneously.

A Thread Radio Encapsulation Link (TREL) protocol layer 318 enables transmission of 6LoWPAN frames over IP link technologies, including Wi-Fi or Ethernet. The TREL protocol layer 318 uses transport layer protocols, such as TCP and/or UDP, and network layer protocols, such as IPv4 and/or IPv6, to encapsulate IEEE 802.15.4 MAC frames. In one alternative, when using Thread-based protocols (e.g., MLE) to discover neighboring TREL devices, the TREL protocol layer 318 assumes a single broadcast domain, accordingly all TREL packets use link-local IPv6 addressing. In another alternative, TREL neighbors may be manually configured (e.g., by an administrator) or automatically configured (e.g., using Domain Name Service-Service Discovery (DNS-SD)). In this case with global address scope, TREL neighbors do not need to be attached to the same physical link and can be any reachable IPv4 or IPv6 destination.

When the multi-phy link layer 316 determines that a 6LoWPAN frame will be transmitted using IEEE 802.15.4 networking, the multi-phy link layer 316 passes the 6LoWPAN frame to an IEEE 802.15.4 Media Access Control (MAC) protocol layer 320 and an IEEE 802.15.4 Physical (PHY) protocol layer 322 for transmission over the Thread network. In one option, a TREL device may omit IEEE 802.15.4 communication hardware (radio) and use only IP-based communication (Wi-Fi and/or Ethernet) for communication in a Thread network. When the multi-phy link layer 316 determines that a 6LoWPAN frame will be transmitted using an IP link technology, the multi-phy link layer 316 passes the 6LoWPAN frame to the TREL protocol layer 318 which transmits the 6LoWPAN frame in TREL packet using an IP-link interface, such as a Wi-Fi MAC protocol layer 324 and a Wi-Fi PHY protocol layer 326, an Ethernet MAC protocol layer 328 and an Ethernet PHY protocol layer 330, or any other suitable IP-link technology. For example, the 6LoWPAN frames are compliant with RFC 4944, RFC 6282 and/or RFC 6775.

The multi-phy link protocol and Thread border routing protocols are independent of each other. A device implementing the multi-phy link protocol may or may not implement Thread border routing. The multi-phy link protocol is a link-layer mechanism, whereas the Thread border routing feature is a network-layer mechanism.

Multi-PHY Link Layer

The multi-phy link layer 316 maintains an information base that includes a PHY Preference Set, a Received 6LoWPAN Frame Set, and a TREL Pending Acknowledgments Set. The multi-phy link layer 316 records preference values in the PHY Preference Set for determining which PHY layer to use when transmitting to neighboring devices. The multi-phy link layer 316 maintains a PHY preference set for each PHY that it supports. A PHY Preference Set includes Neighbor Preference tuples that include an Extended Address and a Preference. The Extended Address is an IEEE 802.15.4 Extended Address used to communicate with a neighboring device and the Preference is a preference value associated with using the associated PHY when communicating with the neighboring device.

Every PHY Preference Set contains one Neighbor Preference tuple for each MLE neighbor entry. When MLE creates a new neighbor entry, new Neighbor Preference tuple(s) are created with an initial Preference value of zero. When MLE removes a neighbor entry, the associated Neighbor Preference tuple(s) are also removed.

The multi-phy link layer 316 records the newest 6LoWPAN frame originated from a given neighbor in the Received 6LoWPAN Frame Set. When updating the 6LoWPAN Frame Set, the multi-phy link layer 316 does not include 6LoWPAN frames not originated by an immediate neighbor that include a Mesh Addressing header. The multi-phy link layer 316 maintains a single Received 6LoWPAN Frame Set. A Received 6LoWPAN Frame Set includes Neighbor Frame tuples that include an Extended Address, a Datagram Tag, and a Datagram Offset. The Extended Address is an IEEE 802.15.4 Extended Address used to communicate with the neighboring device. The Datagram Tag is the newest 6LoWPAN Fragment Header datagram tag received from the neighboring device. The Datagram Offset is the newest 6LoWPAN Fragment Header datagram offset received from the neighboring device.

The multi-phy link layer 316 records the number of unacknowledged TREL packets when transmitting to neighboring devices in the TREL Pending Acknowledgements Set. A TREL Pending Acknowledgements Set includes Neighbor Pending Acknowledgements tuples that include an Extended Address, Current Pending Acks (acknowledgements), Previous Pending Acks, and a Packet Number. The Extended Address is an IEEE 802.15.4 Extended Address used to communicate with the neighboring device. The Current Pending Acks are a number of TREL Ack (acknowledgement) packets the TREL protocol layer 318 is waiting to receive for transmitted packets during a current time window. The Previous Pending Acks are a number of TREL Ack packets the TREL protocol layer 318 is waiting to receive for transmitted packets during a previous time window. The Packet Number is the Packet Number to use when sending the next TREL packet to the neighbor identified by the Extended Address.

The Thread networking protocol utilizes broadcast transmissions to discover neighboring devices. For example, MLE Announce, MLE Discovery Request, and MLE Advertisement messages are sent with IPv6 link-local multicast destination addresses, which map to link-layer broadcast transmissions.

In one aspect, to continue supporting the same discovery mechanisms as previous versions of Thread, the multi-phy link layer 316 transmits all 6LoWPAN frames destined to the broadcast address on all supported PHYs. For example, a device that supports both IEEE 802.15.4 and Wi-Fi transmits each MLE Advertisement on both IEEE 802.15.4 and Wi-Fi.

In an alternative aspect, a characteristic that separates messages used for discovery from normal data communication is the IEEE 802.15.4 MAC frame security configuration. All messages used for discovery either disable MAC frame security or utilize MAC Key ID Mode 2. All data communications use MAC Key ID Mode 1. The multi-phy link layer 316 identifies 6LoWPAN discovery frames for which the destination address is set to the broadcast address (0xffff) and the MAC frame security either Disabled or Enabled with MAC Key ID Mode 2. To continue supporting the same discovery mechanisms as earlier versions of Thread, the multi-phy link layer 316 transmits all 6LoWPAN discovery frames on all supported PHYs. For example, a device that supports both IEEE 802.15.4 and Wi-Fi transmits each 6LoWPAN discovery frame on both IEEE 802.15.4 and Wi-Fi. When transmitting a 6LoWPAN frame destined to the broadcast address but that is not a 6LoWPAN discovery frame, the multi-phy link layer 316 transmits on each PHY where the PHY has the highest preference value for at least one neighboring device with a valid link. 6LoWPAN frames that have a destination address that is an extended address or a short address that is not set to the broadcast address (0xffff) are sent via unicast message transmission.

For IEEE 802.15.4 direct transmissions (MAC frame transmissions initiated by the device itself and not sent in response to receiving an IEEE 802.15.4 Data Request frame), the multi-phy link layer 316 selects the PHY that has the highest preference value for the given destination. If no preference values exist for a given neighbor and the message is an MLE Discovery Response, the multi-phy link layer 316 transmits the 6LoWPAN frame on the same PHY that was used to receive the associated MLE Discovery Request. Otherwise, the multi-phy link later 316 transmits the 6LoW-PAN frame on all supported PHYs. Transmitting on all supported PHYs allows devices to synchronize parent-child links after reset, without needing to store and update PHY preferences in non-volatile storage. If more than one PHY shares the same maximum preference value, the multi-phy link layer 316 selects from the subset of PHYs sharing the same maximum preference value as follows: (i) when transmitting an IEEE 802.15.4 Data Request frame, the multi-phy link layer 316 selects the PHY that has the lowest power profile for completing an indirect transmission, or (ii) when transmitting any other frame, the multi-phy link layer 316 selects the PHY that has the highest channel capacity.

For IEEE 802.15.4 indirect transmissions, (data frame transmissions sent in response to receiving an IEEE 802.15.4 Data Request frame), a Thread router forwarding a data frame via indirect transmission transmits the data frame using the same PHY that received the associated IEEE 802.15.4 Data Request frame. The PHY preference value is not used when sending a Data frame via indirect transmission.

A given 6LoWPAN frame that may be transmitted over multiple PHYs, the receiver may receive the same 6LoW-PAN frame multiple times via different PHYs. To suppress duplicate frames, a frame identifier is included within the 6LoWPAN frame itself. When transmitting a 6LoWPAN frame with IEEE 802.15.4 MAC security enabled, the 6LoWPAN frame includes a 6LoWPAN Fragment Header, even if the encapsulated IPv6 datagram is small and does not require 6LoWPAN fragmentation. The multi-phy link layer 316 uses the Fragment Header's datagram tag to suppress duplicate frames.

Reachability over a given PHY is time varying, either due to time varying wireless communication characteristics, or because the link infrastructure state changes (e.g., a Wi-Fi interface going up or down). While a given PHY is generally more desirable (for example, Wi-Fi over 802.15.4 due to throughput and capacity), communication over a less desirable PHY may occur when a neighbor is unreachable over the more desirable PHY. A more desirable PHY is defined as a PHY that would be selected if the associated Preference values are the same.

When performing direct transmissions, the multi-phy link layer 316 supports link probing to help discover reachability over a more desirable PHY soon after connectivity is restored. Reachability probes are sent using the following procedure:
1. After selecting the PHY for a given direct transmission as described above, the multi-phy link layer 316 identifies all other PHYs supported by the destination.
2. If a more desirable PHY does not exist, the procedure exits here.
3. The device performs a random trial returning a value of one with a probability set to a REACHABILITY_PROBE_PROBABILITY value, and 0 in all other cases. If the random trial returns a value of zero, the procedure exits here.
4. The device performs a reachability probe by sending the same 6LoWPAN frame over the more desirable PHY in addition to the PHY that was previously selected as described with respect to direct transmissions, above.

Reachability probes effectively transmit duplicate 6LoW-PAN frames over different PHYs. One advantage of transmitting duplicate 6LoWPAN frames is to enable redundancy in data transmissions, giving a neighbor additional opportunities to receive the 6LoWPAN frame. Another advantage of transmitting duplicate 6LoWPAN frames is to use existing logic for processing acknowledgments and minimizing specialized logic for reachability probes.

As the multi-phy link layer 316 processes messages, the multi-phy link layer 316 suppresses duplicate messages using the following procedure:
1. If the 6LoWPAN frame does not have MAC security enabled, the procedure exits here.
2. If the 6LoWPAN frame does not have a 6LoWPAN Fragment Header, the procedure exits here.
3. If the Fragment Header's datagram_tag is greater than the associated neighbor's Datagram Tag, the procedure exits here.
4. The frame is marked as a duplicate if one of the following is true:
   (i) The Fragment Header's datagram_tag is less than the associated neighbor's Datagram Tag, or
   (ii) The Fragment Header's datagram_offset is less than or equal to the associated neighbor's Datagram Offset.

When comparing two datagram_tag values, the multi-phy link layer 316 uses the Serial Number Arithmetic as defined in IETF RFC1982. If the 6LoWPAN frame is marked as a duplicate, the multi-phy link layer 316 does not pass the frame up to the next higher layer of the TREL networking stack 300 for processing.

Upon each reception of an IEEE 802.15.4 MAC frame with MAC Security enabled and MAC Key ID Mode 1 from a given PHY, the multi-phy link layer 316 updates the PHY Preference Set associated with the PHY that received the message. When increasing the Preference value for the associated neighbor, the multi-phy link layer 316 increments the Preference value by using a PHY_PREF_TREL_RX_SUCCESS_INCREASE function when the message is received via TREL protocol layer 318 or by using a PHY_PREF_802154_RX_SUCCESS_INCREASE function when the message is received via the IEEE 802.15.4 radio (PHY).

When transmitting a message using IEEE 802.15.4, the multi-phy link layer 316 performs the following update procedure on the PHY Preference Set upon each completion of a data transmission request (e.g., an IEEE 802.15.4 MCPS-DATA.confirm) that requests an Acknowledgement (ACK):
1. When a data transmission request completes (MCPS-DATA.confirm), the associated Neighbor Preference tuple is retrieved from the PHY Preference Set for the 802.15.4 PHY. If no entry exists, the procedure exits here.
2. If the data transmission request was successful (an ACK was successfully received), the Preference for the associated neighbor is increased by the value PHY_PREF_802154_TX_SUCCESS_INCREASE (e.g., increment the Preference value by one).
3. If the data transmission request was not successful due to channel access failure or failure to receive an ACK, the Preference for the associated neighbor is decreased by the value PHY_PREF_802154_TX_FAILURE_DECREASE (e.g., decrement the Preference value by one).

Thread Radio Encapsulation Link Layer

The Thread Radio Encapsulation Link (TREL) layer 318 enables Thread devices to communicate directly over IPv6-based link technologies other than IEEE 802.15.4, including Wi-Fi and Ethernet. Thread devices that communicate using the TREL network protocol stack 300 are connected to the same IPv6 link. The TREL network protocol stack 300 can use large-scope communication to reach neighboring nodes or use link-local IPv6 communication to reach neighboring devices.

A TREL interface is configured with the same link-local IPv6 address as that assigned to the Thread interface. That is, the TREL interface has configured a link-local IPv6 address derived from the same MAC Extended Address used on the IEEE 802.15.4 radio. Using the same link-local IPv6 address avoids the need to discover and maintain address mappings between TREL and Thread interfaces.

Figure 4:
FIG. 4 illustrates an example message format with which aspects of Thread over Internet Protocol can be implemented.

FIG. 4 illustrates an example message format with which aspects of Thread over Internet Protocol can be implemented. The Thread Radio Encapsulation Link (TREL) layer 318 uses UDP messages to transport IEEE 802.15.4 MAC frames.

The TREL message 400 includes a Version field 402 that is a 3-bit unsigned integer that indicates the version of the TREL protocol. For example, the initial version of TREL sets the Version field 402 to the value of zero. The TREL message 400 includes a 2-bit Reserved (Rsv) field 404 that is reserved for future use. The Rsv field 404 is set to a value of zero for transmission and is ignored upon reception.

The TREL message 400 includes a 1-bit A field 406. The A field 406 is set to the value of one to indicate the sending device is requesting a TREL Ack packet for the TREL message 400 or is set to the value zero to indicate that no TREL Ack is requested for this TREL message 400.

The TREL message 400 includes a Type (Typ) field 408 that is a 2-bit unsigned integer. The Typ field 408 indicates the TREL packet type. The Typ field 408 is set to the value of zero to indicate that the TREL packet is a TREL Broadcast packet, is set to the value of one to indicate that the TREL packet is a TREL Unicast packet, or is set to the value of two to indicate that the TREL packet is to indicate a TREL Ack.

The TREL message 400 includes a Channel field 410 that is an 8-bit unsigned integer. The Channel field 410 indicates the IEEE 802.15.4 channel that will be used to transmit the message using an IEEE 802.15.4 PHY. The TREL message 400 includes an 802.15.4 Destination PAN ID field 412 that is a 16-bit unsigned integer (in big-endian format). The 802.15.4 Destination PAN ID field 412 is the IEEE 802.15.4 Destination PAN ID encapsulated in the 6LoWPAN frame. If the frame does not have an 802.15.4 destination PAN ID, the broadcast PAN ID (0xffff) is used.

The TREL message 400 includes a Packet Number field 414 that is a 32-bit unsigned integer (in big-endian format). The contents of the Packet Number field 414 is the packet number associated with a particular TREL packet.

The TREL message 400 includes an 802.15.4 Extended Source Address field 416 that is a 64-bit field (in big-endian format). The contents of the 802.15.4 Extended Source Address field 416 is the IEEE 802.15.4 Extended Address associated with the sender of a given message.

The TREL message 400 may include an 802.15.4 Extended Destination Address field 418 that is a 64-bit field (in big-endian format). The 802.15.4 Extended Destination Address field 418 is included when the TREL packet Type is Unicast or Ack. The contents of the 802.15.4 Extended Destination Address field 418 is the IEEE 802.15.4 Destination Address associated with the receiver of a given message.

The TREL message 400 includes an 802.15.4 MAC Frame field 420 that is a variable-length field. The 802.15.4 Frame field 420 includes an IEEE 802.15.4 frame, which includes an 802.15.4 MAC header, a MAC payload, and a MAC footer. The encapsulated 802.15.4 MAC frame is the same as if it were transmitted using an 802.15.4 radio. The 802.15.4 Frame field 420 is included when the TREL packet type (Typ 408) is Unicast or Broadcast.

The Thread Radio Encapsulation Link (TREL) layer 318 sets the IPv6 Source Address of a TREL message to the link-local address assigned to the Thread interface (the link-local address derived from the MAC Extended address used on the IEEE 802.15.4 radio). When the IEEE 802.15.4 MAC frame 420 contains a destination address that is either an Extended address or a Short address other than the broadcast address, the TREL layer 318 sets the IPv6 Destination Address field 418 to the link-local assigned to the destination node's Thread interface (the link-local address derived from the MAC Extended address assigned to the IEEE 802.15.4 radio of the receiving node for the message).

In one alternative for broadcast messages, when the IEEE 802.15.4 MAC frame contains a broadcast destination address (0xffff), the TREL layer 318 sets the IPv6 Destination Address for the TREL message to the link-local all TREL interfaces multicast address.

In another alternative for broadcast messages, the TREL layer 318 uses a characteristic of IEEE 802.15.4 MAC frame security configuration that separates messages used for discovery from normal data communication. All messages used for discovery either disable MAC frame security or utilize MAC Key ID Mode 2. All data communications use MAC Key ID Mode 1. The TREL link layer 308 identifies IEEE 802.15.4 MAC discovery frames based on the Destination address being set to the broadcast address (0xffff) and the MAC frame security being set to Disabled or Enabled with MAC Key ID Mode 2. When transmitting an IEEE 802.15.4 MAC discovery frame, the TREL layer 318 sets the IPv6 Destination Address of the TREL message to the link-local all TREL interfaces multicast address.

On one aspect, when transmitting a 6LoWPAN frame destined to the broadcast address but the frame is not an IEEE 802.15.4 discovery frame, the TREL layer 318 of a device sends a unicast TREL message to each neighbor to which the device has synchronized. The TREL layer 318 sets the IPv6 Destination Address to the link-local address assigned to each neighbor's Thread interface. The encapsulated 802.15.4 MAC frame remains unchanged and carries the broadcast address. In another aspect, TREL devices may have a list of neighbors configured. The configuration may be manual (e.g., by an administrator) or automatic (e.g., using DNS-SD).

Thread networks use 6LoWPAN to fragment (compressed) IPv6 datagrams that do not fit within a single link frame. A simple implementation would use the same Maximum Transmission Unit (MTU) on both TREL and 802.15.4 links (e.g., a maximum packet size (aMaxPHYPacketSize) of 127 bytes). When the final destination of a 6LoWPAN frame is the neighboring device, the TREL layer 318 may choose to use a larger MTU that reflects the actual capability of the TREL interface. A 6LoWPAN frame's final destination is the neighboring device when it does not carry a 6LoWPAN Mesh Header.

When a 6LoWPAN frame carries a 6LoWPAN Mesh Header, the TREL layer 318 uses the same MTU as 802.15.4 (e.g., aMaxPHYPacketSize of 127 bytes). 6LoWPAN frames carrying a 6LoWPAN Mesh Addressing header may be forwarded over multiple hops, some of which may occur over IEEE 802.15.4 radios. As a result, the TREL layer 318 must use the minimum MTU for 6LoWPAN frames that travel multiple hops.

The TREL layer 318 does not transport IEEE 802.15.4 acknowledgement frames and instead uses TREL Ack packets. A TREL packet has the "A" field 406 set to the value of one when the packet Type is unicast and there is an entry in TREL Pending Acknowledgements set for the destination.

The TREL Ack packet includes (i) an IPv6 Source Address set to the IPv6 Destination Address of the packet being acknowledged, (ii) a Packet Number field 414 set to the same value as set in the packet being acknowledged, (iii) an IPv6 Destination Address set to the IPv6 Source Address of the packet being acknowledged, (iv) the 802.15.4 Extended Source Address field 416 set to the 802.15.4 Extended Destination Address of the packet being acknowledged, and (v) the 802.15.4 Extended Destination Address field 418 set to the 802.15.4 Extended Source Address of the packet being acknowledged.

A TREL device allows the multi-link PHY layer 316 to process the next queued message immediately after successfully submitting the message to the interface of the TREL layer 318. The TREL networking stack 300 does not implement retransmissions because it assumes the underlying link technology (e.g., Wi-Fi) implements its own retransmission logic. Not waiting for acknowledgments allows the TREL layer 318 to take advantage of aggregation techniques provided by the underlying link technology (e.g., Wi-Fi), that can greatly improve throughput and channel utilization.

The TREL layer 318 uses the TREL Ack packets to update the TREL Pending Acknowledgements Set. For each transmission requesting an acknowledgment, the TREL layer 318 increments the Current Pending Acks value in the associated Neighbor Pending Acknowledgments tuple. The TREL Pending Acknowledgments Set maintains the number of pending acknowledgments for a current and previous time windows. The TREL layer 318 periodically advances the time window with a time period of TREL_PENDING_ACK_WINDOW. At the start of each time window, each Neighbor Pending Acknowledgment tuple (i) decreases the Preference value for the associated neighbor in the PHY Preference Set by multiplying the value of Previous Pending Acks and the value of PHY_PREF_TREL_TX_FAILURE_DECREASE, (ii) sets Previous Pending Acks equal to Current Pending Acks, and (iii) sets Current Pending Acks to the value of zero.

Upon receiving a TREL packet 400, the TREL layer 318 processes the packet further: (i) if the value in the Type field 408 is one of the defined types, including Broadcast, Unicast, or Ack, (ii) if the value in the Type field 408 is set to Ack and the A field 406 is set to the value of zero, (iii) if the Destination PAN ID is the broadcast PAN ID (0xffff) or matches the PAN ID configured on the Thread interface, (iv) if the 802.15.4 Extended Source Address 416 does not match the Extended Address assigned to the Thread interface (to drop packets originating from the device itself), and (v) if Type 408 is Unicast, the 802.15.4 Extended Destination Address 418 matches the Extended Address assigned to the Thread interface.

The TREL layer 318 applies the same IEEE 802.15.4 frame security processing to encapsulated 802.15.4 frames as specified in the Thread Specification, Version 1.2, Section 7.2. The TREL layer 318 uses a different MAC key than the IEEE 802.15.4 PHY 322. The TREL layer 318 derives the MAC key from the Thread Master Key using the HMAC-based Extract-and-Expand Key Derivation Function (HKDF) (as specified in IETF RFC5869) using SHA-256 (as specified in IETF RFC6234) as follows:

$$\text{HKDF-Extract} \\ (\text{salt=thrKeySequenceCounter|"ThreadSequencedMasterKey"}, \\ \text{IKM=thrMasterKey}) \rightarrow \text{PRK} \qquad (1)$$

$$\text{HKDF-Expand}(\text{PRK}, \text{info="ThreadOverWiFiKey"}, \\ L=16) \rightarrow \text{TREL MAC Key} \qquad (2)$$

The thrKeySequenceCounter value is represented using big-endian byte ordering. Frame counters between the TREL layer 318 and the IEEE 802.15.4 PHY 322 are maintained separately.

When a device that uses the TREL networking stack 300 performs Mesh Link Establishment (MLE), the device may include a Link-layer Frame Counter TLV (Type-Length-Value) in an MLE message. The device sets the value of the Link-layer Frame Counter TLV to the maximum outgoing link-layer frame counter value of the PHYs supported by the device, and all PHYs are updated to use the same value included in the Link-layer Frame Counter TLV. When storing a link-layer frame counter value received in a Link-layer Frame Counter TLV for a given neighbor, the TREL networking stack 300 updates all PHYs with the received frame counter value.

Upon each reception of an MLE message, a device that uses the TREL networking stack 300 performs an update procedure on the PHY Preference Set associated with the PHY that received the message. If the device successfully completes MLE Message Security Processing and MLE Frame Counter Processing, the Preference value for the associated neighbor is increased. If the MLE Frame Counter Processing fails, the Preference value for the associated neighbor is also increased if (i) an MLEDeviceDescriptor was present, (ii) an auxFrameCounter was equal to a storedFrameCounter, and (iii) the time duration since storedFrameCounter was last updated is less than MLE_DUPLICATE_PREFERENCE_UPDATE_DURATION.

When incrementing, the Preference value for the associated neighbor is incremented by either PHY_PREF_TREL_RX_SUCCESS_INCREASE when received via the TREL layer 318 or PHY_PREF_802154_RX_SUCCESS_INCREASE when received via IEEE 802.15.4 radio.

The initial 6LoWPAN datagram_tag value after reboot is not defined in IETF RFC4944. As such, after a neighboring node resets, the device needs to always accept the first 6LoWPAN frame with Fragment Header it receives. Upon each reception of an MLE message, a device removes the associated Neighbor Frame tuple if (i) an MLEDeviceDescriptor is present, (ii) the device successfully completes MLE Message Security Processing and MLE Frame Counter Processing, and (iii) the MLE Command Type is one of: a MLE Child ID Request, a MLE Child Update Request, or a MLE Link Request.

Example Method

Example method 500 is described with reference to FIG. 5 in accordance with one or more aspects of Thread over Internet Protocol. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the method blocks are described is not intended to be construed as a limitation, and any number of the described method blocks can be combined in any order or skipped to implement a method or an alternate method.

Figure 5:
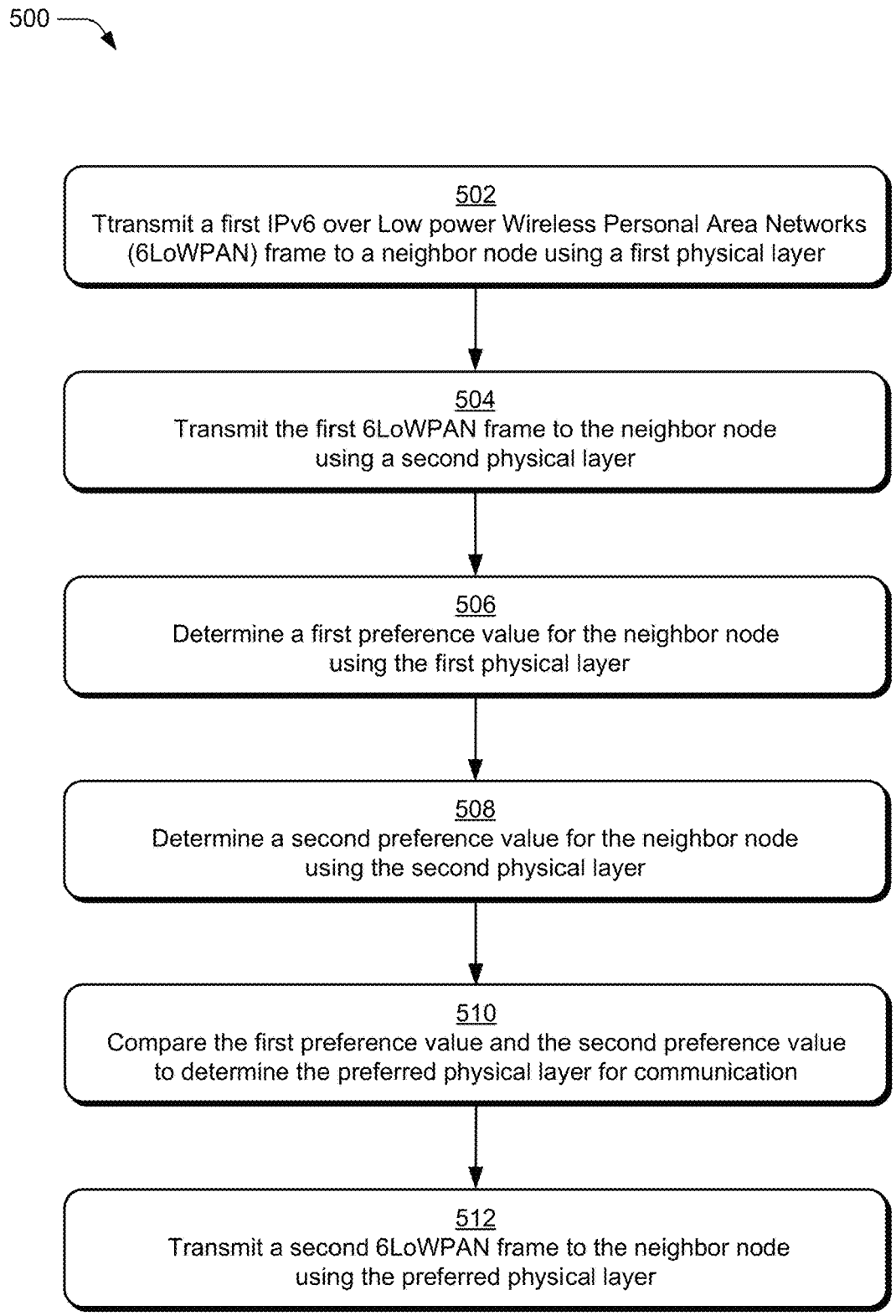
FIG. 5 illustrates an example method for a network node in accordance with one or more aspects of the techniques described herein.

FIG. 5 illustrates example method(s) 500 of Thread over Internet Protocol as generally related to determining a preferred physical layer for communication by a node in a Thread network. At block 502, a node in a Thread network transmits a first IPv6 over Low power Wireless Personal Area Networks (6LoWPAN) frame to a neighbor node using a first physical layer. For example, the node (e.g., the TREL device 220, 222) transmits a first 6LoWPAN frame to a neighbor node (e.g., a router 206, an end device 208, or the border router 106) using a first physical layer, such as transmitting the first 6LoWPAN frame in an IEEE 802.15.4 MAC frame using an IEEE 802.15.4 PHY. For example, a neighboring node is reachable via at least one PHY of the node.

At block 504, the node transmits the first 6LoWPAN frame to the neighbor node using a second physical layer. For example, the node transmits the first 6LoWPAN frame to the neighbor node (e.g., a Wi-Fi device 210 or an Ethernet device 214) using a second physical layer (e.g., Wi-Fi or Ethernet), such as transmitting the first 6LoWPAN frame encapsulated in an IEEE 802.15.4 MAC frame that is encapsulated using the TREL message format 400 and further encapsulated in a UDP frame and an IPv6 packet.

At block 506, the node determines a first preference value for the neighbor node using the first physical layer. For example, based on one or more acknowledgements received from the neighbor node for transmissions made using the first physical layer, the node determines a first preference value for the neighbor node using the first physical layer for communication.

At block 508, the node determines a second preference value for the neighbor node using the second physical layer. For example, based on one or more acknowledgements received from the neighbor node for transmissions made using the second physical layer, the node determines a second preference value for the neighbor node using the second physical layer for communication.

At block 510, the node compares the first preference value and the second preference value to determine the preferred physical layer for communication. For example, the node compares the first and second preference values recoded in the PHY Preference Set and to determine the preferred physical layer for communication with the neighbor node, such as selecting the physical layer with the greatest preference value.

At block 512, the node transmits a second 6LoWPAN frame to the neighbor node using the preferred physical layer. For example, the node transmits a second 6LoWPAN frame to the neighbor node using the preferred PHY.

Example Environments and Devices

Figure 6:
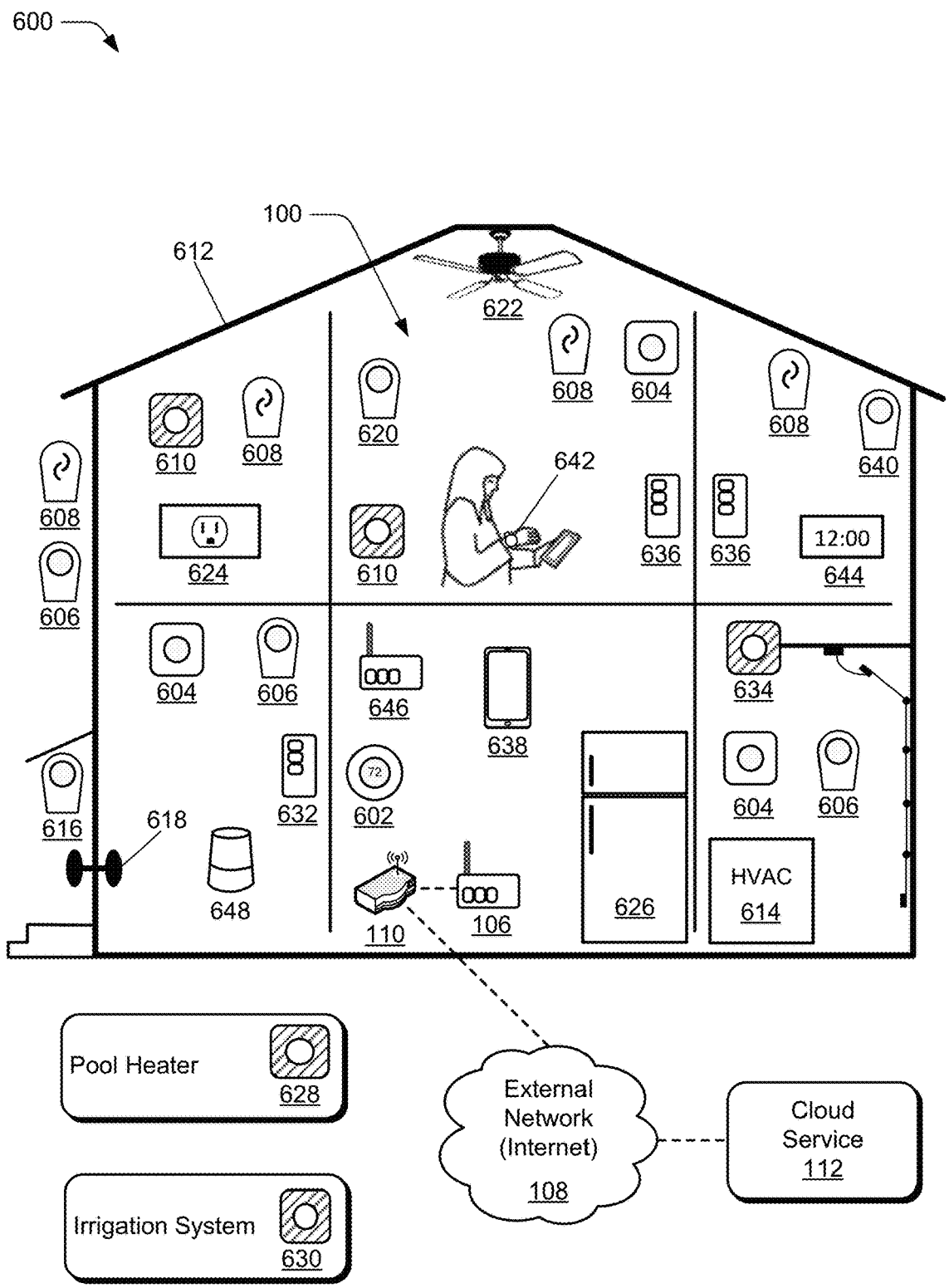
FIG. 6 illustrates an example environment in which aspects of the techniques described herein can be implemented.

FIG. 6 illustrates an example environment 600 in which aspects of Thread over Internet Protocol can be implemented. Generally, the environment 600 includes the home area network (HAN) 200 implemented as part of a home or other type of structure with any number of wireless network devices that are configured for communication in a wireless network. For example, the wireless network devices can include a thermostat 602, hazard detectors 604 (e.g., for smoke and/or carbon monoxide), cameras 606 (e.g., indoor and outdoor), lighting units 608 (e.g., indoor and outdoor), and any other types of wireless network devices 610 that are implemented inside and/or outside of a structure 612 (e.g., in a home environment). In this example, the wireless network devices can also include any of the previously described devices, such as a border router 106, as well as any of the devices implemented as a router device 206, and/or as an end device 208.

In the environment 600, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIG. 7.

In implementations, the thermostat 602 may include a Nest® Learning Thermostat that detects ambient climate characteristics (e.g., temperature and/or humidity) and controls a HVAC system 614 in the home environment. The learning thermostat 602 and other network-connected devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 604 can be implemented to detect the presence of a hazardous substance or a substance indicative of a hazardous substance (e.g., smoke, fire, or carbon monoxide). In examples of wireless interconnection, a hazard detector 604 may detect the presence of smoke, indicating a fire in the structure, in which case the hazard detector that first detects the smoke can broadcast a low-power wake-up signal to all of the connected wireless network devices. The other hazard detectors 604 can then receive the broadcast wake-up signal and initiate a high-power state for hazard detection and to receive wireless communications of alert messages. Further, the lighting units 608 can receive the broadcast wake-up signal and activate in the region of the detected hazard to illuminate and identify the problem area. In another example, the lighting units 608 may activate in one illumination color to indicate a problem area or region in the structure, such as for a detected fire or break-in, and activate in a different illumination color to indicate safe regions and/or escape routes out of the structure.

In various configurations, the wireless network devices 610 can include an entryway interface device 616 that functions in coordination with a network-connected door lock system 618, and that detects and responds to a person's approach to or departure from a location, such as an outer door of the structure 612. The entryway interface device 616 can interact with the other wireless network devices based on whether someone has approached or entered the smart-home environment. An entryway interface device 616 can control doorbell functionality, announce the approach or departure of a person via audio or visual means, and control settings on a security system, such as to activate or deactivate the security system when occupants come and go. The wireless network devices 610 can also include other sensors and detectors, such as to detect ambient lighting conditions, detect room-occupancy states (e.g., with an occupancy sensor 620), and control a power and/or dim state of one or more lights. In some instances, the sensors and/or detectors may also control a power state or speed of a fan, such as a ceiling fan 622. Further, the sensors and/or detectors may detect occupancy in a room or enclosure and control the supply of power to electrical outlets or devices 624, such as if a room or the structure is unoccupied.

The wireless network devices 610 may also include connected appliances and/or controlled systems 626, such as refrigerators, stoves and ovens, washers, dryers, air conditioners, pool heaters 628, irrigation systems 630, security systems 632, and so forth, as well as other electronic and computing devices, such as televisions, entertainment systems, computers, intercom systems, garage-door openers 634, ceiling fans 622, control panels 636, and the like. When plugged in, an appliance, device, or system can announce itself to the home area network as described above and can be automatically integrated with the controls and devices of the home area network, such as in the home. It should be noted that the wireless network devices 610 may include devices physically located outside of the structure, but within wireless communication range, such as a device controlling a swimming pool heater 628 or an irrigation system 630.

As described above, the HAN 200 includes a border router 106 that interfaces for communication with an external network, outside the HAN 200. The border router 106 connects to an access point 110, which connects to the access network 108, such as the Internet. A cloud service 112, which is connected via the access network 108, provides services related to and/or using the devices within the HAN 200. By way of example, the cloud service 112 can include applications for connecting end user devices 638, such as smartphones, tablets, and the like, to devices in the home area network, processing and presenting data acquired in the HAN 200 to end users, linking devices in one or more HANs 200 to user accounts of the cloud service 112, provisioning and updating devices in the HAN 200, and so forth. For example, a user can control the thermostat 602 and other wireless network devices in the home environment using a network-connected computer or portable device, such as a mobile phone or tablet device. Further, the wireless network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, etc.).

Any of the wireless network devices in the HAN 200 can serve as low-power and communication nodes to create the HAN 200 in the home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 640 detects that the room is dark and when the occupancy sensor 620 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (e.g., network-connected device to network-connected device) within the home environment as well as over the Internet to a central server or cloud-computing system.

In other configurations, various ones of the wireless network devices can function as "tripwires" for an alarm system in the home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 608 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 608 that lead to a safe exit. The light units 608 may also be turned-on to indicate the direction along an exit route that a person should travel to safely exit the structure.

The various wireless network devices may also be implemented to integrate and communicate with wearable computing devices 642, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 610 may also include a network-connected alarm clock 644 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 602 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 602 so as to pre-heat or cool the environment to a desired setting and turning-on or turning-off the lights 608.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 600 may include one or more wireless network devices that function as a hub 646. The hub 646 may be a general-purpose home automation hub, or an application-specific hub, such as a security hub, an energy management hub, an HVAC hub, and so forth. The functionality of a hub 646 may also be integrated into any wireless network device, such as a network-connected thermostat device or the border router 106. Hosting functionality on the hub 646 in the structure 612 can improve reliability when the user's internet connection is unreliable, can reduce latency of operations that would normally have to connect to the cloud service 112, and can satisfy system and regulatory constraints around local access between wireless network devices.

Additionally, the example environment 600 includes a network-connected speaker (network-connected assistant device) 648. The network-connected speaker 648 provides voice assistant services that include providing voice control of network-connected devices. The functions of the hub 646 may be hosted in the network-connected speaker 648. The network-connected speaker 648 can be configured to communicate via the wireless mesh network 202, the Wi-Fi network 204, or both.

Figure 7:
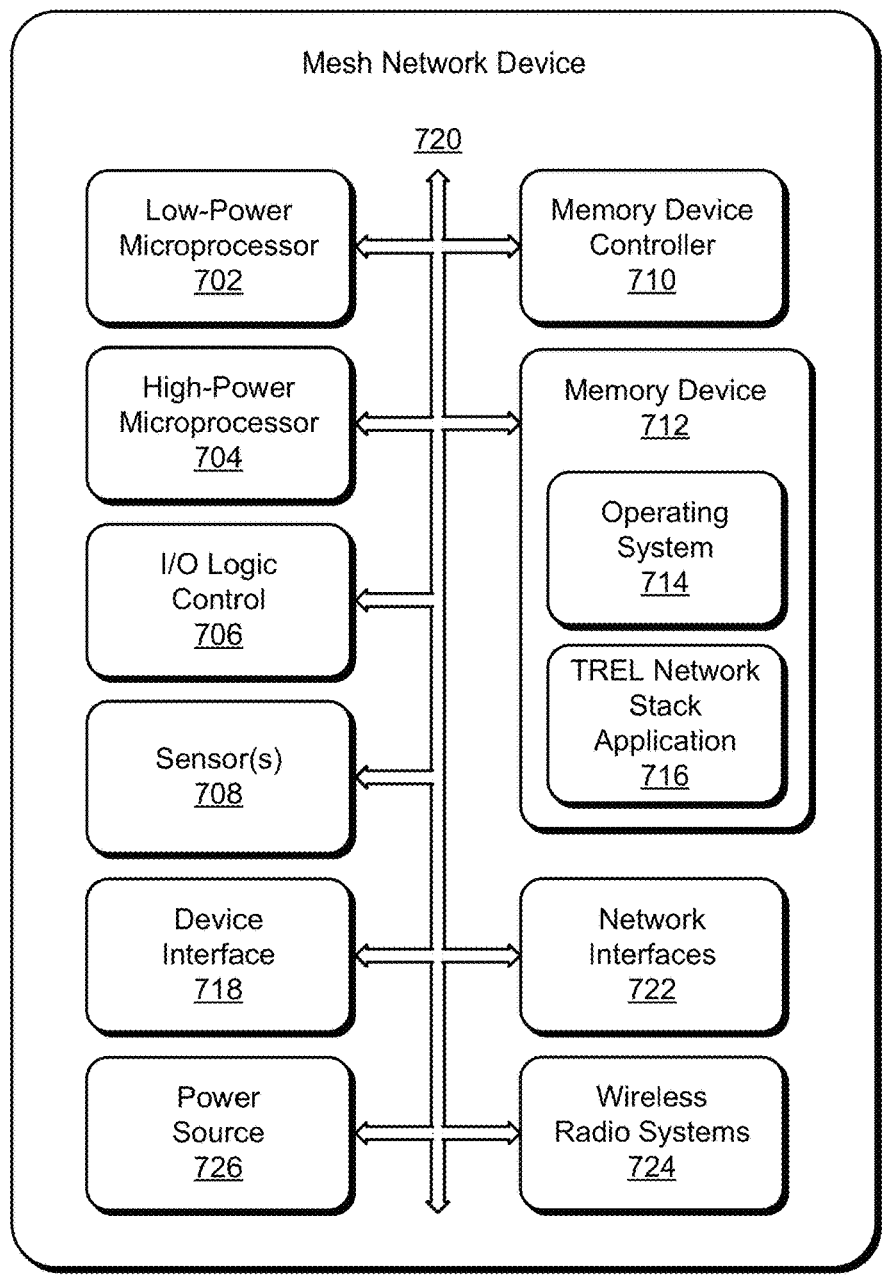
FIG. 7 illustrates an example wireless network device that can be implemented in a home area network in accordance with one or more aspects of the techniques described herein.

FIG. 7 illustrates an example wireless network device 700 that can be implemented as any of the wireless network devices (nodes) in a home area network (Thread network, fabric network, Weave network, CHIP network) in accordance with one or more aspects of Thread over Internet Protocol as described herein. The device 700 can be integrated with electronic circuitry, microprocessors, memory, input output (I/O) logic control, communication interfaces and components, as well as other hardware, firmware, and/or software to implement the device in a home area network. Further, the wireless network device 700 can be implemented with various components, such as with any number and combination of different components as further described with reference to the example device shown in FIG. 8.

In this example, the wireless network device 700 includes a low-power microprocessor 702 and a high-power microprocessor 704 (e.g., microcontrollers or digital signal processors) that process executable instructions. The device also includes an input-output (I/O) logic control 706 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 702 and the high-power microprocessor 704 can also support one or more different device functionalities of the device. For example, the high-power microprocessor 704 may execute computationally intensive operations, whereas the low-power microprocessor 702 may manage less-complex processes such as detecting a hazard or temperature from one or more sensors 708. The low-power processor 702 may also wake or initialize the high-power processor 704 for computationally intensive processes.

The one or more sensors 708 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, the sensors 708 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the wireless network device 700 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or automation objectives.

The wireless network device 700 includes a memory device controller 710 and a memory device 712, such as any type of a nonvolatile memory and/or other suitable electronic data storage device. The wireless network device 700 can also include various firmware and/or software, such as an operating system 714 that is maintained as computer executable instructions by the memory and executed by a microprocessor. The device software may also include a TREL network stack application 716 that implements aspects of the TREL network stack 300 for Thread over Internet Protocol. The wireless network device 700 also includes a device interface 718 to interface with another device or peripheral component and includes an integrated data bus 720 that couples the various components of the wireless network device for data communication between the components. The data bus in the wireless network device may also be implemented as any one or a combination of different bus structures and/or bus architectures.

The device interface 718 may receive input from a user and/or provide information to the user (e.g., as a user interface), and a received input can be used to determine a setting. The device interface 718 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 718 may also receive inputs from any number of peripherals, such as buttons, a keypad, a switch, a microphone, and an imager (e.g., a camera device).

The wireless network device 700 can include network interfaces 722, such as a home area network interface for communication with other wireless network devices in a home area network, wired network devices (e.g., Ethernet-connected devices), and an external network interface for network communication, such as via the Internet. The wireless network device 700 also includes wireless radio systems 724 for wireless communication with other wireless network devices via the home area network interface and for multiple, different wireless communications systems. The wireless radio systems 724 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The wireless network device 700 also includes a power source 726, such as a battery and/or to connect the device to line voltage. An AC power source may also be used to charge the battery of the device.

Figure 8:
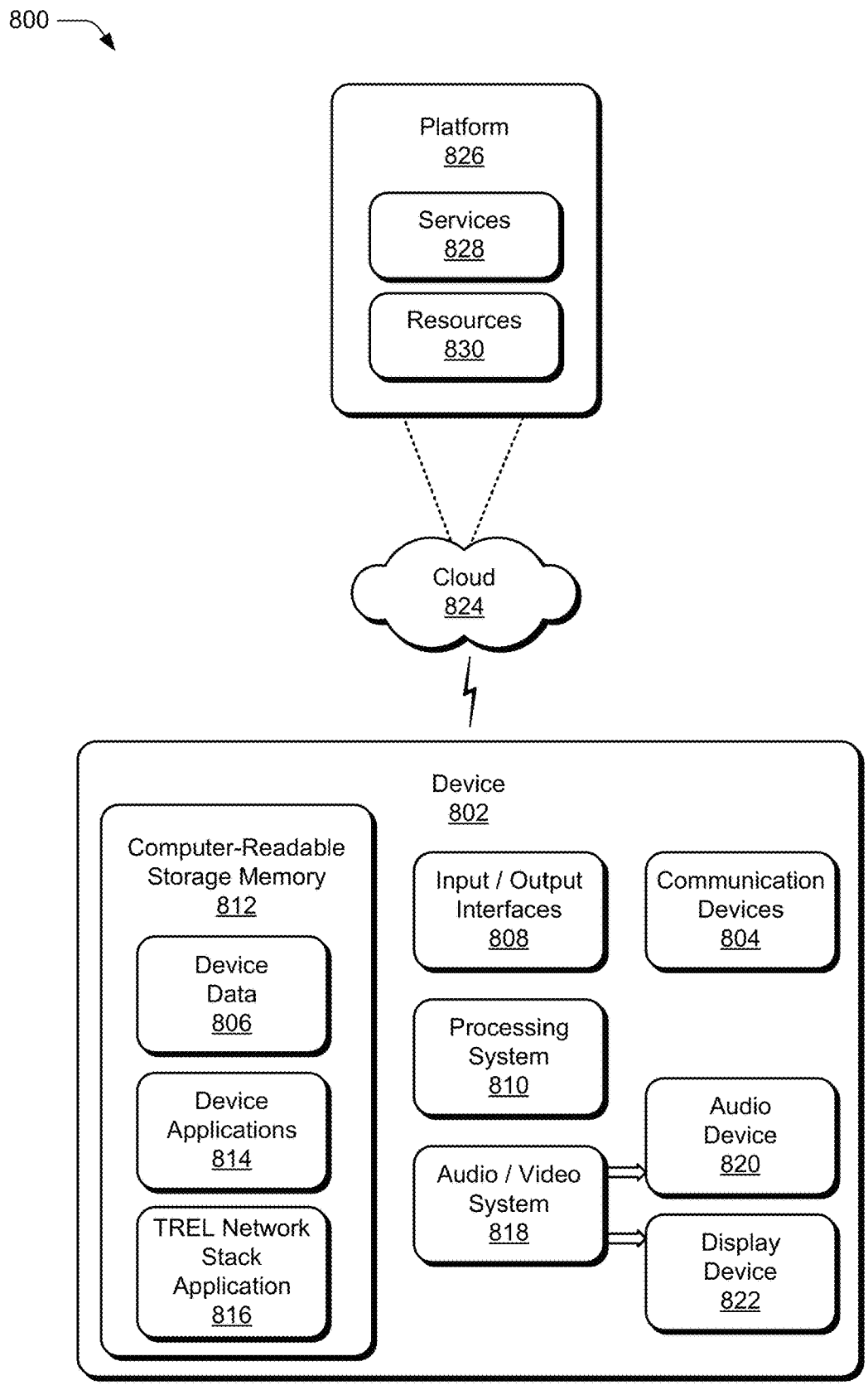
FIG. 8 illustrates an example system with an example device that can implement aspects of Thread over Internet Protocol.

FIG. 8 illustrates an example system 800 that includes an example device 802, which can be implemented as any of the wireless network devices that implement aspects of Thread over Internet Protocol as described with reference to the previous FIGS. 1-7. The example device 802 may be any type of computing device, client device, mobile phone, tablet, communication, entertainment, gaming, media playback, and/or other type of device. Further, the example device 802 may be implemented as any other type of wireless network device that is configured for communication on a home area network, such as a thermostat, hazard detector, camera, light unit, commissioning device, router, border router, joiner router, joining device, end device, leader, access point, and/or other wireless network devices.

The device 802 includes communication devices 804 that enable wired and/or wireless communication of device data 806, such as data that is communicated between the devices in a home area network, data that is being received, data scheduled for broadcast, data packets of the data, data that is synched between the devices, etc. The device data can include any type of communication data, as well as audio, video, and/or image data that is generated by applications executing on the device. The communication devices 804 can also include transceivers for cellular phone communication and/or for network data communication.

The device 802 also includes input/output (I/O) interfaces 808, such as data network interfaces that provide connection and/or communication links between the device, data networks (e.g., a home area network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage memory 812, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 812 provides storage of the device data 806 and various device applications 814, such as an operating system that is maintained as a software application with the computer-readable storage memory and executed by the processing system 810. The device applications may also include a device manager, such as any form of a control application, software application, signal processing and control module, code that is native to a particular device, a hardware abstraction layer for a particular device, and so on. In this example, the device applications also include a TREL network stack application 816 that implements the TREL network stack 300 in accordance with aspects of Thread over Internet Protocol, such as when the example device 802 is implemented as any of the wireless network devices described herein.

The device 802 also includes an audio and/or video system 818 that generates audio data for an audio device 820 and/or generates display data for a display device 822. The audio device and/or the display device include any devices that process, display, and/or otherwise render audio, video, display, and/or image data, such as the image content of a digital photo. In implementations, the audio device and/or the display device are integrated components of the example device 802. Alternatively, the audio device and/or the display device are external, peripheral components to the example device. In aspects, at least part of the techniques described for Thread over Internet Protocol may be implemented in a distributed system, such as over a "cloud" 824 in a platform 826. The cloud 824 includes and/or is representative of the platform 826 for services 828 and/or resources 830.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device aspect with functionality distributed throughout the system 600. For example, the functionality may be implemented in part at the example device 802 as well as via the platform 826 that abstracts the functionality of the cloud 824.

In the following some examples are described:

Example 1: A method for determining a preferred physical layer for communication by a node in a network, the method comprising:
  transmitting a first Internet Protocol version 6, IPv6, over Low power Wireless Personal Area Networks, 6LoW-PAN, frame to a neighbor node using a first physical layer;
  transmitting the first 6LoWPAN frame to the neighbor node using a second physical layer;
  determining a first preference value for the neighbor node using the first physical layer;
  determining a second preference value for the neighbor node using the second physical layer;
  comparing the first preference value and the second preference value to determine the preferred physical layer for communication; and
  transmitting a second 6LoWPAN frame to the neighbor node using the preferred physical layer.

Example 2: The method of example 1, wherein the transmitting the first 6LoWPAN frame to the neighbor node using the first physical layer comprises:
  transmitting the first 6LoWPAN frame in an IEEE 802.15.4 Media Access Control, MAC, frame.

Example 3: The method of example 1 or example 2, wherein the transmitting the first 6LoWPAN frame to the neighbor node using the second physical layer comprises:
  encapsulating the first 6LoWPAN frame in an IEEE 802.15.4 MAC frame;
  encapsulating the IEEE 802.15.4 MAC frame in a transport protocol frame; and
  transmitting the transport protocol frame in an Internet Protocol packet.

Example 4: The method of example 3, wherein the second physical layer is a Wi-Fi physical layer or an Ethernet physical layer.

Example 5: The method of example 3, wherein the transport protocol is a Transmission Control Protocol, TCP, or a User Datagram Protocol, UDP.

Example 6: The method of example 3, wherein the Internet Protocol is an Internet Protocol version 4, IPv4, protocol or an Internet Protocol version 6, IPv6, protocol.

Example 7: The method of any one of the preceding examples, the method further comprising:
  receiving one or more acknowledgement packets from the neighbor node using the first physical layer, the second physical layer, or both the first physical layer and the second physical layer.

Example 8: The method of example 7, wherein the receiving one or more acknowledgement packets from the neighbor node comprises:
  receiving one or more Thread Radio Encapsulation Link, TREL, acknowledgement packets from the neighbor node.

Example 9: The method of example 7, wherein the first preference value for the first physical layer is based on one or more acknowledgements received from the neighbor node for transmissions made using the first physical layer, and wherein the second preference value for the second physical layer is based on one or more acknowledgments received from the neighbor node for transmissions made using the second physical layer.

Example 10: The method of example 9, wherein the comparing the first preference value and the second preference value to determine the preferred physical layer for communication comprises:
  selecting the physical layer with the greatest preference value as the preferred physical layer.

Example 11: The method of example 9, wherein the first preference value and the second preference value are equal, and wherein the comparing the first preference value and the second preference value to determine the preferred physical layer for communication comprises:
  selecting the physical layer with the lowest power profile for transmitting an IEEE 802.15.4 Data Request frame; or
  selecting the physical layer with the highest channel capacity for transmitting a frame other than an IEEE 802.15.4 Data Request frame.

Example 12: The method of any one of the preceding examples, the method further comprising:
  storing the first preference value and an address of the neighbor node in a physical layer, PHY, preference set; and
  storing the second preference value and the address of the neighbor node in the PHY preference set.

Example 13: The method of example 12, wherein the address is an IEEE 802.15.4 extended address.

Example 14: The method of any one of the preceding examples, the method further comprising:
recording a pending acknowledgement for the transmitted first 6LoWPAN frame and the second transmitted second 6LoWPAN frame in a Thread Radio Encapsulation Link, TREL, pending acknowledgement set.

Example 15: THE method of example 14, wherein the pending acknowledgement is recorded in a tuple including:
an extended address of the neighbor node;
a number of pending acknowledgements in a current time window;
a number of pending acknowledgements in a previous time window; and
a packet number to use when transmitting a next packet to the neighbor node.

Example 16: The method of any one of the preceding examples, wherein the first physical layer is an IEEE 802.15.4 physical layer.

Example 17: The method of any one of the preceding examples, wherein the network is a Thread Network.

Example 18: An electronic device comprising:
a first network interface;
a second network interface;
one or more processors; and
memory comprising instructions executable by the one or more processors to perform any one of the methods of examples 1 to 17.

Example 19: The electronic device of example 18, wherein the first network interface is an IEEE 802.15.4 network interface.

Example 20: The electronic device of example 18 or example 19, wherein the second network interface is a Wi-Fi interface or an Ethernet interface.

Example 21: A computer-readable storage media comprising instructions that, responsive to execution by a processor, cause a method as recited in any one of examples 1 to 17 to be performed.

Although aspects of Thread over Internet Protocol have been described in language specific to features and/or methods, the subject of the appended claims is not necessarily limited to the specific features or methods described. Rather, the specific features and methods are disclosed as example implementations of Thread over Internet Protocol, and other equivalent features and methods are intended to be within the scope of the appended claims. Further, various different aspects are described, and it is to be appreciated that each described aspect can be implemented independently or in connection with one or more other described aspects.

The invention claimed is:

1. A method for determining a preferred physical layer for communication by a node in a wireless network implementing a Thread specification, the method comprising:
transmitting a first Internet Protocol version 6 (IPv6) over a first Low power Wireless Personal Area Networks (6LoWPAN) frame to a neighbor node using a first physical layer;
transmitting the first 6LoWPAN frame to the neighbor node using a second physical layer;
determining a first preference value for the neighbor node using the first physical layer based on one or more acknowledgement packets received from the neighbor node for transmissions made using the first physical layer;
determining a second preference value for the neighbor node using the second physical layer based on one or more Thread Radio Encapsulation Link (TREL) acknowledgement packets received from the neighbor node for transmissions made using the second physical layer;
comparing the first preference value and the second preference value to determine the preferred physical layer for communication comprising selecting the physical layer with the greatest preference value as the preferred physical layer; and
transmitting a second 6LoWPAN frame to the neighbor node using the preferred physical layer.

2. The method of claim 1, wherein the transmitting the first 6LoWPAN frame to the neighbor node using the first physical layer comprises:
transmitting the first 6LoWPAN frame in an IEEE 802.15.4 Media Access Control (MAC) frame.

3. The method of claim 1, wherein the transmitting the first 6LoWPAN frame to the neighbor node using the second physical layer comprises:
encapsulating the first 6LoWPAN frame in an IEEE 802.15.4 MAC frame;
encapsulating the IEEE 802.15.4 MAC frame in a transport protocol frame; and
transmitting the transport protocol frame in an Internet Protocol packet.

4. The method of claim 3, wherein the second physical layer is a Wi-Fi physical layer or an Ethernet physical layer.

5. The method of claim 3, wherein the transport protocol is a Transmission Control Protocol (TCP) or a User Datagram Protocol (UDP) and wherein the Internet Protocol is an Internet Protocol version 4 (IPv4) protocol or an Internet Protocol version 6 (IPv6) protocol.

6. The method of claim 1, wherein the first preference value and the second preference value are equal, and wherein the comparing the first preference value and the second preference value to determine the preferred physical layer for communication comprises:
selecting the physical layer with the lowest power profile for transmitting an IEEE 802.15.4 Data Request frame; or
selecting the physical layer with the highest channel capacity for transmitting a frame other than an IEEE 802.15.4 Data Request frame.

7. The method of claim 1, the method further comprising:
storing the first preference value and an address of the neighbor node in a physical layer (PHY) preference set; and
storing the second preference value and the address of the neighbor node in the PHY preference set.

8. The method of claim 1, the method further comprising:
recording a pending acknowledgement for the transmitted first 6LoWPAN frame and the transmitted second 6LoWPAN frame in a Thread Radio Encapsulation Link (TREL) pending acknowledgement set.

9. The method of claim 8, wherein the pending acknowledgement is recorded in a tuple including:
an extended address of the neighbor node;
a number of pending acknowledgements in a current time window;
a number of pending acknowledgements in a previous time window; and
a packet number to use when transmitting a next packet to the neighbor node.

10. The method of claim 1, wherein the first physical layer is an IEEE 802.15.4 physical layer.

11. An electronic device implementing a Thread specification, comprising:
- a first network interface;
- a second network interface;
- one or more processors; and
- memory comprising instructions executable by the one or more processors to configure the electronic device to:
- transmit a first Internet Protocol version 6 (IPv6) over a first Low power Wireless Personal Area Networks (6LoWPAN) frame to a neighbor node using a first physical layer;
- transmit the first 6LoWPAN frame to the neighbor node using a second physical layer;
- determine a first preference value for the neighbor node using the first physical layer based on one or more acknowledgement packets received from the neighbor node for transmissions made using the first physical layer;
- determine a second preference value for the neighbor node using the second physical layer based on one or more Thread Radio Encapsulation Link (TREL) acknowledgement packets received from the neighbor node for transmissions made using the second physical layer;
- compare the first preference value and the second preference value to determine a preferred physical layer for communication comprising selection of the physical layer with the greatest preference value as the preferred physical layer; and
- transmit a second 6LoWPAN frame to the neighbor node using the preferred physical layer.

12. The electronic device of claim 11, wherein the instructions to transmit the first 6LoWPAN frame to the neighbor node using the first physical layer configure the electronic device to:
- transmit the first 6LoWPAN frame in an IEEE 802.15.4 Media Access Control (MAC) frame.

13. The electronic device of claim 11, wherein the instructions to transmit the first 6LoWPAN frame to the neighbor node using the second physical layer configure the electronic device to:
- encapsulate the first 6LoWPAN frame in an IEEE 802.15.4 MAC frame;
- encapsulate the IEEE 802.15.4 MAC frame in a transport protocol frame; and
- transmit the transport protocol frame in an Internet Protocol packet.

14. The electronic device of claim 13, wherein the second physical layer is a Wi-Fi physical layer or an Ethernet physical layer.

15. The electronic device of claim 11, wherein the instructions are executable to further configure the electronic device to:
- store the first preference value and an address of the neighbor node in a physical layer (PHY) preference set; and
- store the second preference value and the address of the neighbor node in the PHY preference set.

16. The electronic device of claim 11, wherein the first preference value and the second preference value are equal, and wherein the instructions to compare the first preference value and the second preference value to determine the preferred physical layer for communication are executable to further configure the electronic device to:
- select the physical layer with the lowest power profile for transmitting an IEEE 802.15.4 Data Request frame; or
- select the physical layer with the highest channel capacity for transmitting a frame other than an IEEE 802.15.4 Data Request frame.

17. The electronic device of claim 13, wherein the transport protocol is a Transmission Control Protocol (TCP) or a User Datagram Protocol (UDP) and wherein the Internet Protocol is an Internet Protocol version 4 (IPv4) protocol or an Internet Protocol version 6 (IPv6) protocol.

18. The electronic device of claim 11, wherein the instructions are executable to further configure the electronic device to:
- record a pending acknowledgement for the transmitted first 6LoWPAN frame and the transmitted second 6LoWPAN frame in a Thread Radio Encapsulation Link (TREL) pending acknowledgement set.

19. The electronic device of claim 18, wherein the pending acknowledgement is recorded in a tuple including:
- an extended address of the neighbor node;
- a number of pending acknowledgements in a current time window;
- a number of pending acknowledgements in a previous time window; and
- a packet number to use when transmitting a next packet to the neighbor node.

20. The electronic device of claim 11, wherein the first physical layer is an IEEE 802.15.4 physical layer.

* * * * *